United States Patent [19]

Klein

[11] Patent Number: 4,828,331

[45] Date of Patent: May 9, 1989

[54] BRAKE SYSTEM FOR AUTOMOTIVE VEHICLES

[75] Inventor: Hans-Christof Klein, Hattersheim, Fed. Rep. of Germany

[73] Assignee: Alfred Teves GmbH, Franfurt am Main, Fed. Rep. of Germany

[21] Appl. No.: 131,159

[22] Filed: Dec. 10, 1987

[30] Foreign Application Priority Data

Dec. 17, 1986 [DE] Fed. Rep. of Germany ....... 3643141

[51] Int. Cl.$^4$ ............................ B60T 8/32; B60T 8/26
[52] U.S. Cl. ........................................ 303/31; 60/581; 188/356; 303/9.69; 303/9.75
[58] Field of Search .................... 303/4, 31, 9.62, 9.66, 303/9.72, 9.67, 9.71, 9.73, 9.74, 9.75; 188/356, 357; 60/581, 591, 549

[56] References Cited

U.S. PATENT DOCUMENTS

| | | | |
|---|---|---|---|
| 3,517,970 | 6/1970 | Cripe | 303/31 |
| 3,862,781 | 1/1975 | King et al. | 303/9.69 |
| 4,603,921 | 8/1986 | Liggett | 303/9.69 |
| 4,708,401 | 11/1987 | Klein | 303/9.75 |
| 4,715,667 | 12/1987 | Otsuki et al. | 303/119 |

Primary Examiner—Andres Kashnikow
Assistant Examiner—Matthew C. Graham
Attorney, Agent, or Firm—James B. Raden

[57] ABSTRACT

This brake system contains a braking pressure generator aggregate which influences the rear axle braking pressure so as to control the braking force distribution between front and rear axles in dependence on the static and dynamic axle load distribution and on other parameters resulting from the braking behavior. The braking pressure generator aggregate is connected to a tandem master brake cylinder and pressurized by an operating pressure, the braking pressure generator aggregate reduces in a ratio corresponding to a basic rating of the braking force distribution and makes available for basic rear axle braking pressure. The tandem master brake cylinder thus performs the major part of the braking operation at the rear axle. A vacuum servo drive is a part of the braking pressure generator aggregate and is activated in order to raise or lower the braking pressure at the rear axle above or below the basic braking pressure. In doing so, the vacuum servo drive performs but a small part of the braking operation at the rear axle.

5 Claims, 5 Drawing Sheets

BRAKE SYSTEM FOR AUTOMOTIVE VEHICLES

BACKGROUND OF THE INVENTION

This invention relates to a brake system for automotive vehicles and, more particularly, to such a system having a device for controlling the distribution of the braking force to the front and rear axles depending upon the static and dynamic axle load distribution and other parameters resulting from the braking behavior. Such systems also have: sensors for detecting corresponding measured values such as the rotational behavior of the wheels, the velocity of the vehicle, the longitudinal deceleration of the vehicle, etc; an electronic control unit for transforming the measured values to generate braking pressure control signals; and a braking pressure generator aggregate operable by an auxiliary drive means for influencing the braking pressure at the rear axle by means of the control signals.

Nowadays, braking force distributors or pressure reducers which are load-responsive, deceleration-responsive or which depend on the braking pressure in accordance with a predetermined characteristic line are used for a better distribution of the braking force to the front and rear axles of a vehicle. The respective axle load distribution is subject to static and dynamic influences and thus depends on the load condition of the vehicle, on the slowing-down, and on other influences. By virtue of said auxiliary drive means, on the one hand, the braking of the front and rear axles is as uniform as possible. On the other hand, it is more difficult to lock-up of the rear wheels. It has to be ensured that, in case of overbraking, or rather in case of excessive braking pressure occurring, for instance, on a slippery road surface, the rear wheels can lock only after the front wheels; otherwise, there is a high danger of skidding due to the loss of the lateral guiding force at the locked wheel. In such an arrangement there exists the disadvantage that one can achieve only a relatively rough approximation of the braking force distribution to the factual static and dynamic axle load distribution. Therefore, in order to render the dangerous lock-up of the rear wheels more difficult, the brake systems have to be rated so as to ensure that, in most situations, the major part of the braking force is received by the front wheels.

It has already been suggested to electronically control the braking force distribution, or rather the part of the braking force received by the rear wheels, in dependence on the rotational behavior of the front wheels (German Patent Application No. P 33 01 948.7 corresponding to my pending U.S. application Ser. No. 562,196 filed Dec. 16, 1983). To this end, braking pressure modulators are inserted into the pressure medium path to the rear wheel brakes. In the rest position, said braking pressure modulators block the passage of pressure medium. By means of said braking pressure modulators it is possible to electronically control the flow and, hence, the part of the braking force received by the rear wheel brakes so that there is an approximately ideal braking force distribution to the front and rear axles. In this arrangement, electromagnetically operable high-speed multidirectional valves are used as braking pressure modulators. Said valves bring about the desired braking pressure increase at the rear axle by short-time or clocked changing-over into the flow condition.

This control of the braking force distribution between front and rear axles which work without the use of auxiliary energy and, in particular, without an auxiliary drive of the pressure modulators is limited with regard to its possibilities as it only allows a pressure increase, and not a pressure reduction, to be achieved at the rear wheel brake cylinders. Research now has revealed that, despite constant hydraulic actuating pressure, there are variable wheel braking force during a braking operation. The variations in wheel braking forces are due to thermal instability of the brake pads in use today. This can result in a change in the rear axle braking force share of more than 205 after the completion of the electronically controlled adaptive metering-in of the rear axle braking pressure. To compensate for the change in the rear axle braking force share, it is desirable to be able to reduce the braking pressure at the rear axle by a corresponding amount. A braking pressure reduction at the rear wheels can also prove necessary for the purpose of preventing a lock-up in case of a reduction in the friction coefficient during the braking operation.

In order to enable such a braking pressure reduction, according to a further suggestion (German Patent Application No. P 33 06 611.6 corresponding to my co-pending U.S. application Ser. No. 846,479 filed on Mar. 31, 1986 as a continuation of application Ser. No. 581,297 filed Feb. 17, 1984) additional valves are provided in the rear axle brake circuit. With the additional valves, it is possible to remove pressure to a pressure compensation reservoir in case of an imminent lock-up. However, this procedure does not provide an increase in the braking pressure in the rear wheel brakes during the same braking operation. The volume reserve of the master brake cylinder which is rapidly depletable would also impose narrow limits on the possibility of repeated correction cycles.

In another device for electronically controlled adaptive braking force distribution between front and rear axles the braking pressure at the rear axle is generated by a separate braking pressure generator completely uncoupled from the front axle brake circuit and operated by a controlled auxiliary drive in the form of a vacuum servo drive. Thus, it is possible to meter in the rear axle braking pressure in complete independence of the front axle braking pressure. In particular, it is possible to increase and reduce the rear axle braking pressure in respect of the front axle braking pressure in repeated control cycles. The required expense in terms of equipment, however, is high as the braking pressure generator generating the full rear axle braking pressure is complicated, expensive, and bulky. Its operation requires a high auxiliary energy and this has to be taken into consideration in rating the vehicle's engine. Also, there are some objections with regard to safety because trouble in the auxiliary energy supply may result in a total failure of the rear axle brake circuit.

SUMMARY OF THE INVENTION

It is an object of this invention to provide a device for electronically controlled adaptive braking force distribution between the front and rear axles of an automotive vehicle which device, during any braking operation, with minimal equipment and little use of auxiliary energy, achieves a braking force distribution and a slip control with repeated pressure reduction or increase and maintains a braking effect at the rear axle even in case of a failure of the auxiliary energy supply.

This object is achieved by the present invention wherein the braking pressure generator aggregate is pressurized by an operating pressure corresponding to the braking pressure at the front axle for making available a basic rear axle braking pressure. The braking pressure generator aggregate reduces the operating pressure in a ratio corresponding to a basic rating of the braking force distribution. The braking pressure at the rear axle can be raised above or reduced below the basic breaking pressure by means of an auxiliary drive.

Thus, the braking pressure generator aggregate is not used as a braking pressure generator of the full rear axle braking pressure, but as a pressure modulator. It is fed with an operating pressure corresponding to the front axle braking pressure. The braking pressure generator aggregate can readily be connected to one hydraulic circuit of a tandem master brake cylinder the other hydraulic circuit of which supplies one or several wheel brakes at the wheels of the front axle. Without using auxiliary energy, the braking pressure generator aggregate acting as a pressure reducer makes available a basic braking pressure for the rear axle brake circuit. The energy required therefor and amounting to the major part of the rear axle braking energy is generated in the usual manner by the tandem master cylinder. The auxiliary drive of the braking pressure generator aggregate is used only for modifying the braking pressure at the rear axle in respect of the basic braking pressure and, in particular, for raising and reducing it in repeated correction cycles. The amount of auxiliary energy required therefor is small and it is possible to rate the auxiliary drive of the braking pressure generator aggregate considerably less expensively than that of the previously mentioned braking pressure generator. Further, there is the advantage that the basic braking pressure will be maintained even in case of failure of the auxiliary energy supply. The rear wheel brakes then will continue to contribute a large, if not an electronically completely optimally controlled share of the braking of the vehicle.

The braking pressure generator aggregate can have a hydraulic cylinder with a piston which is arranged therein and which, with a first piston surface, borders on a working chamber pressurized by the operating pressure and which, with a second piston surface, borders on a working chamber communicating with the rear axle brake circuit. This design corresponds to that of conventional pressure reducers. Thus, it is possible to inexpensively feed the braking pressure generator aggregate and make available the basic rear axle braking pressure. Moreover, this invention provides that the piston is displaceable by means of the auxiliary drive so that it is possible to modulate the braking pressure at the rear axle.

A flow communication can exist between the working chambers of the hydraulic cylinder contained in the braking pressure generator aggregate, which flow communication is locked and released depending on the position of the piston. In particular, the piston can have an axial pocket communicating with one of the working chambers and have an expansion hole radially extending therefrom and leading to the other working chamber. In another design, the piston is a plunger piston with a tappet valve arranged therein. Both designs are characterized by ease of manufacture and inexpensive construction.

The piston can be acted upon by a spring element supporting the hydraulic force exerted by the rear axle brake circuit on the piston. The spring element has a resetting function. Moreover, the spring element can reduce the basic braking pressure at the rear axle in respect of the operating pressure by an amount proportional to the force of the spring. Thus, variable predetermined limits are possible which, statically and dynamically, provide an excellent braking operation.

It is also possible to provide a hydraulic resetting of the piston, by combining a hydraulic resetting device with a spring element of the mentioned type. In such a case, the effective piston surfaces should have a surface ratio which, with the force of the spring, if any, taken into consideration, corresponds to the basic rating of the braking force distribution. In case of a mere spring-type resetting device, the piston surfaces can be the same in size. Often the piston surface pressurized by the pressure of the rear axle brake circuit will be larger in size than the piston surface pressurized by the operating pressure so as to achieve a basic braking pressure reduction caused by the ratio of the effective piston surfaces without the auxiliary drive become effective.

Preferably, with the flow communication locked between the working chambers and in the presence of a spring element, the auxiliary drive acts on the piston against the force of said spring element. Thus, the auxiliary drive can act both on the front end and on the periphery of the piston. In a preferred design, the auxiliary drive is a vacuum servo drive with two chambers separated by a movable wall which is connected with the piston. One of the chambers permanently communicates with the atmosphere and the other chamber can be evacuated and acted upon by air acted upon by a controlled vacuum. With such a vacuum servo drive it is possible to advantageously make use of the construction of a conventional vacuum brake booster.

The vacuum servo drive's chamber which can be evacuated preferably is operated by a 3/3-way valve which alternatively locks a connection of the chamber and connects it with a vacuum source or the atmosphere. The 3/3-way valve can be realized by an electric-motor-driven rotary slide valve or by a multiple arrangement of 2/2-way valves. A particularly compact structure is achieved by integrating the 3/3-way valve into the housing of the vacuum servo drive.

The electronic control unit operating the braking pressure generator aggregate preferably works with an algorithm according to which at first wheels to be compared at the front and rear axles are controlled to the same rotating velocity, then the braking pressure at the rear axle is reduced by a predetermined differential pressure, which action can be repeated in rapid cycles. The wheels to be compared, for instance, may be a front wheel and a rear wheel. However, there is also the possibility of referring to an average value of the speed at the front wheels and/or rear wheels for the sake of control. The same rotating velocity of the wheels to be compared means the same frictional connection stress. By means of the reduction of the braking pressure at the rear axle the friction connection stress is reduced by a predetermined measure. This form of control is simple and precise as it is easily possible to control two wheels to run in the same way. The object of control of establishing a proportional differential velocity between the wheels to be compared could be achieved only with an imcomparably greater expenditure and with less accuracy.

BRIEF DESCRIPTION OF THE DRAWING

This invention will be explained in more detail in the following, reference being made to examples of embodiments represented in the drawing.

DETAILED DESCRIPTION OF PREFERRED EMBODIMENTS

Figure 1:
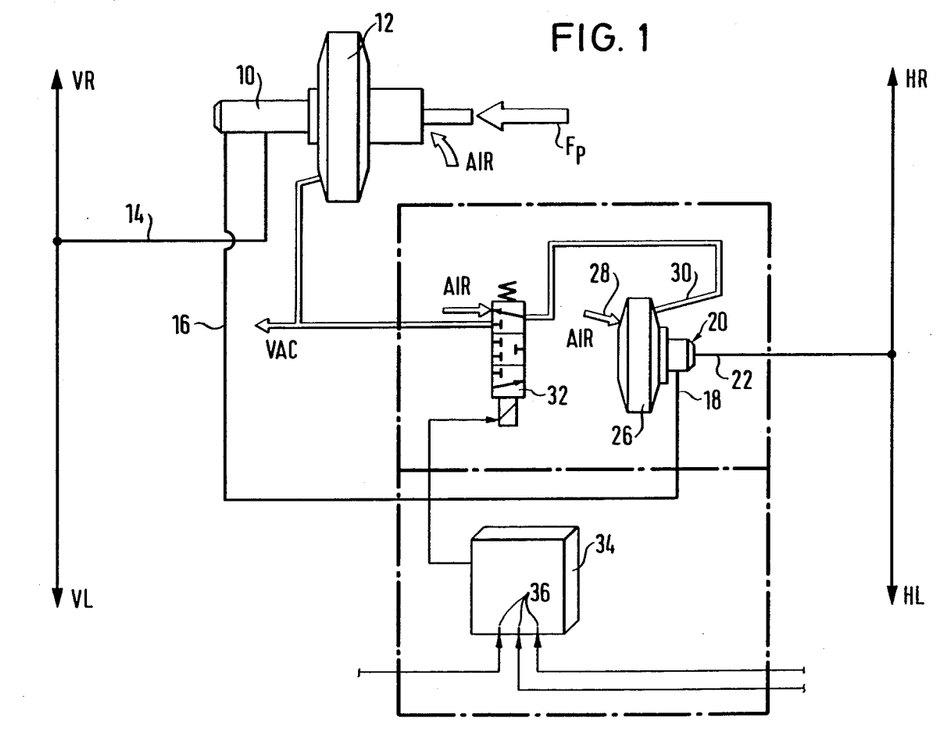
FIG. 1 is the connection diagram of a brake system with a braking pressure generator aggregate provided in the rear axle brake circuit.

The brake system shown in FIG. 1 has a tandem master brake cylinder 10 operatively connected with a vacuum brake booster 12. The booster 12 has a first working chamber permanently communicating with a vacuum source VAC and also a second working chamber likewise evacuated when the brake is not applied. Upon the brake being depressed by a pedal force $F_P$ the vacuum connection with the second working chamber is blocked and air (AIR) is admitted into the second working chamber. Thus, the pedal force $F_P$ is supported by the differential pressure building up at a movable wall separating the working chambers.

A first hyraulic circuit 14 of the tandem master brake cylinder 10 feeds wheel brake cylinders VL and VR belonging to front wheels brakes and not illustrated in detail. A second hydraulic circuit 16 of the tandem master brake cylinder 10 is under an operating pressure equalling the front axle braking pressure and communicates with the connection 18 of a braking pressure generator aggregate 20. A second connection 22 leads from the braking pressure generator aggregate 20 to the wheel brake cylinders HL and HR of wheel brakes belonging to the rear axle. The braking pressure generator aggregate 20 affects the rear axle braking pressure and, hence, the braking force distribution to the front and rear axles.

Attached to the braking pressure generator aggregate 20 is a vacuum servo drive 26. Operation of the vacuum servo drive 26 raises or lowers the braking pressure at the rear axle. The vacuum servo drive 26 has two chambers separated by a movable wall. One of said chambers permanently communicates with the atmosphere via a connection 28. A connection 30 leading to the other chamber can be blocked by means of a 3/3-way solenoid valve 32 or, alternatively, can be connected with the vacuum source VAC or the atmosphere AIR.

The 3/3-way solenoid valve 32 is controlled by braking pressure control signals of an electronic control unit 34. The unit 34 is connected with sensors at input ports 36 and these sensors furnish the important measured values for determining the braking force distribution to the rear and front axles in dependence on the static and dynamic axle load distribution and if applicable, on other parameters resulting from the braking behavior. Other measured values include, but are not limited to, the rotational behavior of the wheels, the vehicle's velocity, the longitudinal deceleration of the vehicle, etc. The measured values are processed in the electronic control unit 34 for generating the braking pressure control signals to the solenoid valve 32.

The brake system is rated so that the tandem master brake cylinder 10 connected to the braking pressure generator aggregate generates a major part of the braking operation at the rear axle. The braking pressure generator aggregate 20 works as a hydraulically actuated pressure reducer reducing an input operating pressure equalling the front axle braking·pressure in accordance with a basic rating of the braking force distribution so as to generate a basic rear axle braking pressure. The vacuum servo drive 26 functions to modulate the braking pressure at the rear axle in respect of said basic braking pressure, i.e., to both raise it and reduce it which may happen by a switching of the 3/3-way solenoid valve 32 in a rapid succession of cycles. The rear axle braking operation share contributed by the vacuum servo drive 26 during such action is relatively low.

Figure 2:
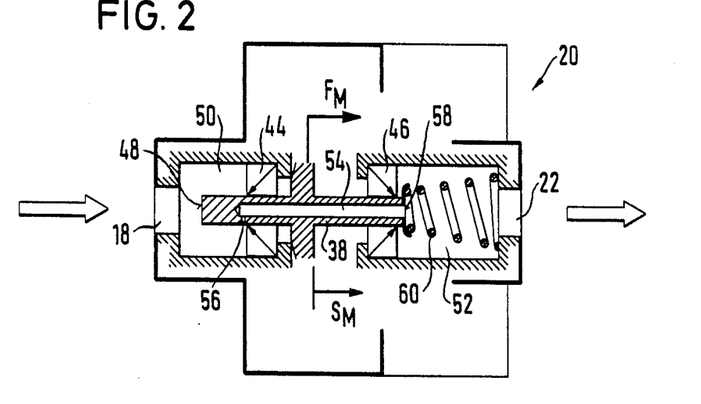
FIGS. 2, 3, and 4 show schematic sectional views of various embodiments of a hydraulic cylinder contained in the braking pressure generator aggregate.
Figure 3:
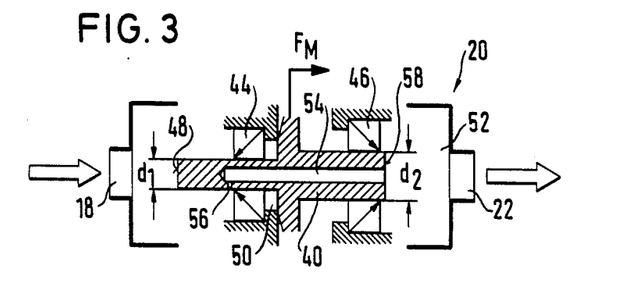
Figure 4:
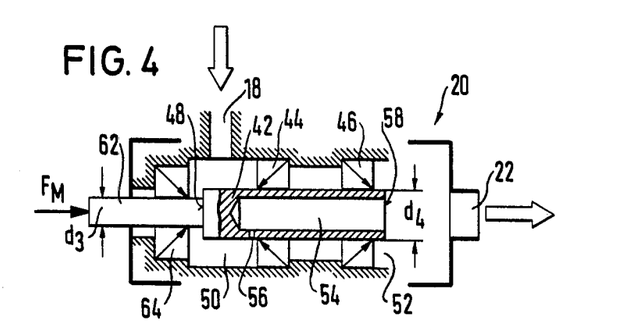

FIGS. 2 through 4 each show a different hydraulic cylinder used as part of the braking pressure generator aggregate 20. Each hydraulic cylinder houses an axially displaceable control piston 38, 40 or 42 (FIGS. 2, 3, and 4, respectively). In each case, the control piston 38, 40 or 42 is slidably supported in sealing/guiding packages 44, 46. With a first effective piston surface 48, each piston lies in a working chamber 50 communicating with the tandem master brake cylinder 20 via the connection 18 and pressurized by the operating pressure. As already explained, the operating pressure equals the front axle braking pressure. At their other ends, the control pistons 38, 40, 42 lie in a second working chamber 52 that communicates with the rear axle brake circuit via the connection 22. Each of the control pistons 38, 40, 42 has a central axial pocket bore 54 opening in the second working chamber 52. A radial expansion hole 56 leads from the pocket bore, adjacent its closed end, into the first working chamber 50. The annular surface located around the open end of the bore 54 and lying in the second working chamber 52 forms with the bottom of the pocket bore 54, a second effective piston surface 58 of the control pistons 38, 40, 42. The same can be displaced in the axial direction so that the expansion hole 56 overrides the sealing/guiding package 44, and closes the hydraulic communication between the working chambers 50, 52. On the one hand, piston movements are effected by an unbalance of the hydraulic forces acting on the control pistons 38, 40, 42 and, on the other hand, by an actuating force $F_M$ of the vacuum servo drive 26.

In the embodiment according to FIG. 2, the two effective end piston surfaces 48, 58 of the control piston 38 are the same in size. However, the piston 38 additionally is acted upon the force of a spring element 60 designed as a helical compression spring and accommodated in the second working chamber 52. On the front end, the spring element 60 supports itself on the control piston 38 and acts on the piston 38 with a force supporting the pressure active from the rear axle brake circuit. When the vacuum servo drive 26 is not active, there is a force balance at the control piston 38 when the hydraulic pressure in the rear axle brake circuit is lower than the operating pressure prevailing in the first working chamber 50, with the measure of pressure reduction being determined by the characteristic of the spring element 60. The braking pressure generator aggregate 20 balances the pressure by means of small control oscillations of the control piston 38 in the manner of a purely hydraulic pressure reducer, without the vacuum servo drive 26 becoming active. The vacuum servo drive 26, in accordance with FIG. 2, acts on the outer periphery of the control piston 38 between the sealing/guiding packages 44, 46. Upon activation of the vacuum servo drive 26, the control piston 38 is displaced. Thereby, in particular, there exists the possibility of locking the expansion hole 56. The pressure in the rear axle brake circuit then can be influenced by means of the vacuum servo drive 26 in the upward and downward directions. In this control phase, too, the operating pressure in the first working chamber 50 acts on the control piston 38. Thus, the braking force at the rear axle in fact is generated for a major part by the tandem master brake cylinder 10.

The embodiment of FIG. 3 provides a purely hydraulic balancing of the basic rear axle braking pressure. The effective piston surface 58 lying in the working chamber 52 of the rear axle brake circuit is larger than the piston surface 48 pressurized by the operating pressure. The basic rear axle braking pressure is thereby reduced in respect of the operating pressure by a factor corresponding to the surface ratio of the effective piston surfaces 48, 58. A spring element is not provided in the embodiment of FIG. 3. It is also possible to combine the embodiments of FIGS. 2 and 3 to have a spring element act on a control piston with effective piston surfaces differing in size (not illustrated). In the embodiment of FIG. 3, the vacuum servo drive 26 acts on the periphery of the control piston 40 while the hydraulic connections 18, 22 are arranged axially thereto.

FIG. 4 shows a further example of an embodiment of a braking pressure general aggregate 20 balanced purely hydraulically. In this embodiment the vacuum servo drive 26 acts on the front side of the control piston 42. For this purpose, a rod 62 is passed outwards though a further sealing/guiding package 64. The rod 62 has a smaller diameter $d_3$ than the control piston 42 itself (diameter $d_4$). The size of the effective piston surface 48 in the first working chamber 50 therefore is determined by the difference in diameters, $d_4$ minus $d_3$, and it is clearly smaller than the effective piston surface 58 lying in the rear axle brake circuit and having the diameter $d_4$. The connection 18 toward the tandem master brake cylinder 10 is arranged radially, an axial connection 22 being provided for the rear axle brake circuit.

Figure 5:
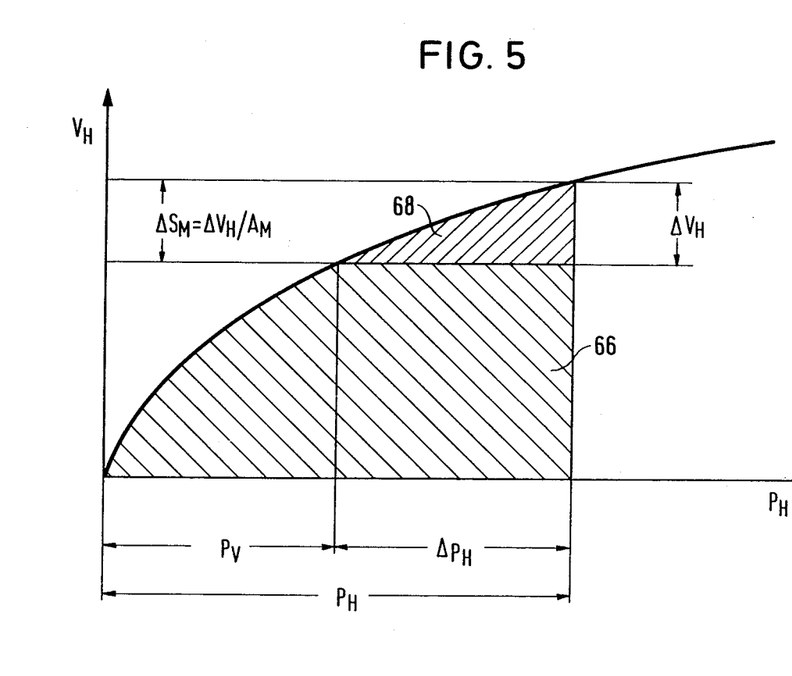
FIG. 5 is a diagram showing the increase in volume of the rear axle brake circuit with variance in the prssure prevailing therein and the distribution of the increasing pressure in the braking pressure generator aggregate.

FIG. 5 is a diagram illustrating the distribution of the braking operating within the rear axle brake circuit. Shown is the increase in volume of the rear axle brake circuit as a fraction of the pressure prevailing therein. The hatched surface 66 represents the pressure increase in the rear axle brake circuit generated by the tandem master brake cylinder 10. The considerably smaller area 68 is a measure of the modulation generated by the vacuum servo drive 26 when the control piston 38, 40, 42, driven by the piston surface $A_M$, is displaced by a stroke $S_M$ which action is accompanied by a pressure modulation in the rear axle brake circuit by the pressure difference $P_H$ and by a displacement of the volume increase by $V_H$. The modulation 68 represents a small fraction of the braking operation to be performed in total at the rear axle.

Figure 6:
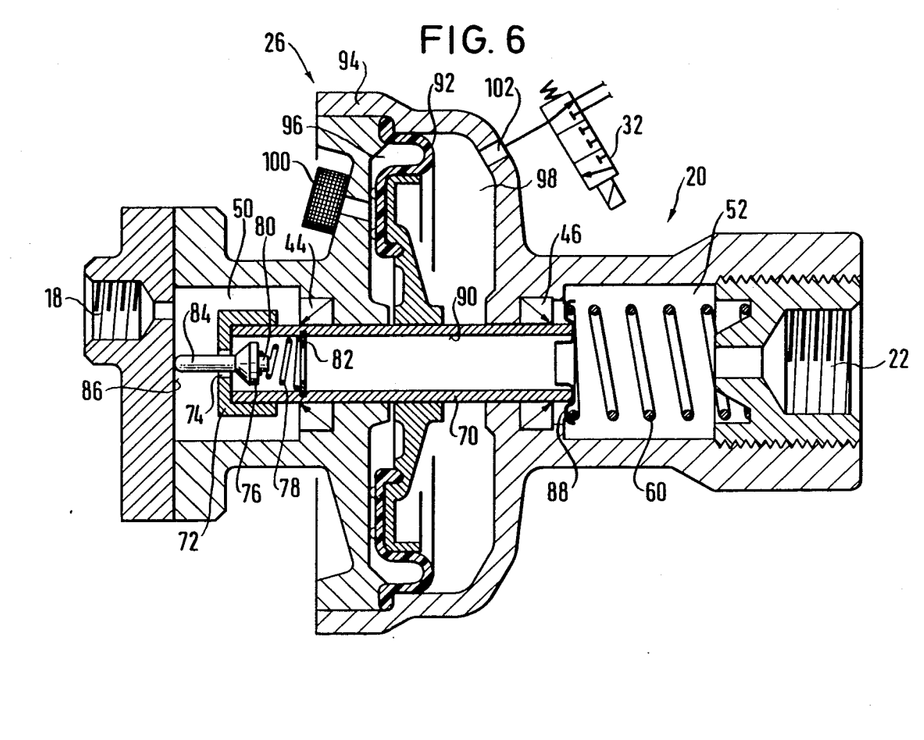
FIG. 6 is the sectional view of a braking pressure generator aggregate with a vacuum servo drive.

FIG. 6 shows a braking pressure generator aggregate 20 with a control piston in the form of a hollow cylindrical plunger 70 containing a tappet valve. At its end projecting into the first working chamber the plunger 70 is closed by a front wall 72 having a central opening 74. Inside the plunger piston 70 there is a conical valve member 76 that rests at the front wall 72. The valve member 76 is biased by the force of a closing spring 78 which lies around a guide pin 80 on the back side of the valve member 76 and which, on the other end, supports itself on a retaining ring 82. On the other side, the valve member 76 is acted upon by a tappet 84 projecting through the opening 74 with clearance and abutting a wall 86 of the first working chamber 50. Radially offset from the tappet 84 is the connection 18 to the tandem master brake cylinder 10, which connection 18 leads into said working chamber 50.

The plunger 70 is received axially displaceable between sealing packages 44, 46 and is acted upon by the force of a spring element 60 arranged in the second working chamber 52 and supported at one end on a spring plate indicated at 88. When the tappet valve is open, a hydraulic communication between the working chambers 50, 52 is established through the central bore 90 of the plunger 70. By means of the contact of the tappet 84 at the wall 86 the tappet valve is kept in its open position against the force of the closing spring 78. With the pressure conditions in the working chambers 50, 52 being unbalanced, the plunger 70 can only be displaced in a purely hydraulic manner so that the tappet valve opens and closes in a short succession of cycles. Thereby, a basic rear axle braking pressure is in the second working chamber 52 corresponding to the basic rating of the braking force distribution.

In the area between the sealing/guiding packages 44, 46, the plunger 70 is connected on its radial outside with the movable wall 92 of a vacuum servo drive 26. Said wall divides two working chambers 96, 98 in a housing 94. One of said working chambers 96 permanently communicates with the atmosphere via an air filter 100. The other working chamber 98 is operated by the 3/3-way solenoid valve 32 at the connection 102. By means of clocked evacuation and ventilation of the working chamber 98 an actuating force is exerted on the plunger 70 whereby the same can be displaced so that the tappet valve closes. The braking pressure in the rear axle brake circuit then can be raised or lowered in respect of the predetermined basic rear axle braking pressure with the tandem master brake cylinder 10 further generating the major part of the braking operation at the rear axle and with the vacuum servo drive 26 generating a comparatively small additional modulating function.

Figure 7:
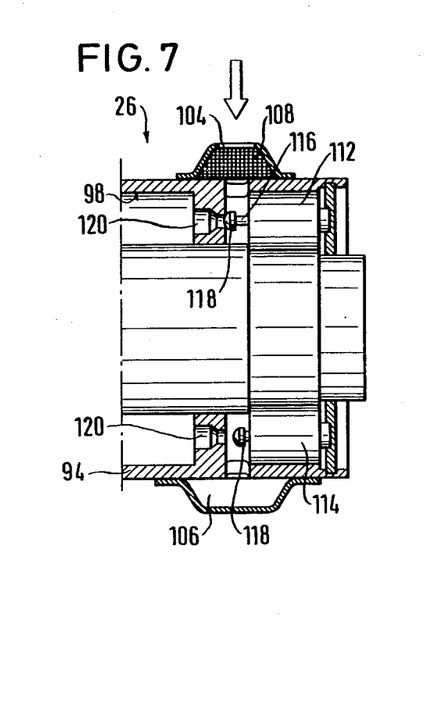
FIGS. 7-8 are, respectively, the longitudinal section and the front view of a valve arrangement operating the vacuum servo drive.
Figure 8:
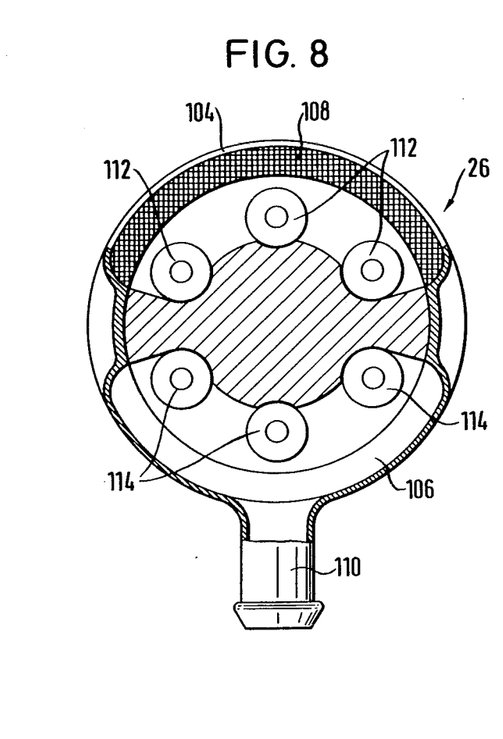

FIGS. 7 and 8 illustrate an embodiment wherein 3/3-way solenoid valve is integrated into the housing 94 of the vacuum servo drive 26. The housing 94 has peripheral connecting areas 104 and 106 for respectively air and vacuum, which areas extend at the same axial level or location and each of which extends over a considerable portion of the housing circumference 94. In the air connecting area 104 an air filter 108 can be seen. A vacuum connecting socket 110 extends from the vacuum connecting area 106. The 3/3-way valve 32 functionally is realized by a multiple arrangement of 2/2-way solenoid valves provided in a coaxial ring radially inside of the connecting areas 104, 106. Three 2/2-way solenoid valves 112 lie in the air connecting area 104 and three 2/2-way solenoid valves 114 lie in the vacuum connecting area 106, with the circumferential distance between all solenoid valves 112, 114 essentially being the same. As can be seen from FIG. 7, the solenoid valves 112, 114 have a circular cylindrical housing with an axially extending valve tappet 116 projecting centrally therefrom. At the head of the valve tappet 116 a valve member 118 is provided which cooperates with an opening 120 leading into the chamber 98.

In total, six such openings 120 are provided which alternately can be blocked, or individually or as a plurality, released by the activation of the solenoid valves 112, 114. With this, one has at disposal the passage cross section via which the chamber 98 is evacuated or ventilated, respectively, and it is possible to establish the pressure difference at the movable wall 92 sensitively and quickly within wide limits.

The described valve arrangement 112, 114 within the housing 94 of the vacuum servo drive 26 entails a particular compact design. This can also be achieved in that a 3/3-way valve is integrated as an electric-motor-driven rotary slide valve, especially with stepping motor drive, into the housing of the vacuum servo drive (not illustrated).

What is claimed is:

1. In a brake system for an automotive vehicle including a pedal actuated tandem master cylinder having a first cylinder connected via a first circuit to apply braking pressure to the front wheel brakes of said vehicle and a second cylinder connected via a second circuit to simultaneously apply braking pressure to the rear wheel brakes of said vehicle, and control means operatively connected in said second circuit for varying the braking pressure applied to said rear wheel brakes relative to the braking pressure applied to said front wheel brakes in response to sensed variations in vehicle operating parameters, said control means including sensing means for generating a control signal representative of an optimum relationship between the braking pressures respectively applied to said front and rear brakes, variable in accordance with the vehicle operating parameters as sensed by said sensing means, and pressure adjusting means for varying the braking pressure applied to said rear brakes in response to variations in said control signal;

the improvement wherein said pressure adjusting means comprises a housing defining a first and a second working chamber, sliding seal means disposed between said chambers, an elongate piston sealingly received in said sealing means for axial sliding movement and having opposite first and second ends projecting from said sealing means respectively into said first and second chambers, said first chamber being in direct fluid communication with said second cylinder and said second chamber being in direct fluid communication with said rear brakes;

said piston including pressure balancing means operable during a normal application of braking pressure to said brakes and the absence of a control signal from said sensing means to establish a stationary equilibrium position of said piston relative to said housing and sealing means wherein the pressure in said first chamber applied to said first end of said piston and the pressure in said second chamber applied to said second end of said piston are in a predetermined ratio to each other, and auxiliary pressure responsive means responsive to the generation of a control signal by said sensing means for varying said predetermined ratio by applying a force displacing said piston from said equilibrium position to selectively increase or decrease the pressure in said second chamber in response to variations of said control signal.

2. The invention defined in claim 1 wherein said pressure balancing means comprises means defining a passage in said piston opening at one end through said second end into said second chamber and opening at its opposite end into a radial bore extending from said passage to the exterior of said piston at a location adjacent said first end of said piston, said bore being blocked by said sealing means when said piston is in said equilibrium position and said piston being movable from said equilibrium in response to the release of braking pressure from said first chamber to a rest position wherein said bore opens into said first chamber.

3. The invention defined in claim 2 wherein the effective area of end face at said first end of said piston is less than the effective area of the end face of said second end.

4. The invention defined in claim 2 wherein the effective areas of the first and second ends of said piston are equal, and said balancing means further comprises spring means axially biasing said piston toward said first chamber.

5. The invention defined in claim 1 wherein said auxiliary pressure responsive means comprises a vacuum source, means defining a constant pressure chamber and a variable pressure chamber separated from each other by a movable wall movable in response to a pressure differential between said constant and variable chambers, means venting said constant pressure chamber to atmosphere, coupled to said sensing means and valve means and operable to (a) connect said second chamber to said vacuum source, (b) vent said second chamber to atmosphere or (c) seal said second chamber in accordance with control signals generated by said sensing means, and means coupling said wall to said piston to displace said piston in response to movement of said movable wall.

* * * * *